United States Patent [19]
Tsang et al.

[11] Patent Number: 5,877,721
[45] Date of Patent: Mar. 2, 1999

[54] APPARATUS AND METHOD FOR MITIGATING MULTIPATH

[75] Inventors: Shiu Ming Tsang, College Point; Gerald P. Salvatore, Jr., Northport, both of N.Y.

[73] Assignee: Northrop Grumman Corporation, Los Angeles, Calif.

[21] Appl. No.: 27,428

[22] Filed: Feb. 20, 1998

[51] Int. Cl.$^6$ .................................................. G01S 13/91
[52] U.S. Cl. ............................................................ 342/36
[58] Field of Search .............................. 342/36, 148, 40, 342/159, 146, 37–39; 701/223

[56] References Cited

U.S. PATENT DOCUMENTS

| | | | |
|---|---|---|---|
| 4,970,518 | 11/1990 | Cole, Jr. ..................................... | 342/37 |
| 5,374,932 | 12/1994 | Wyschogrod et al. .................... | 342/36 |

FOREIGN PATENT DOCUMENTS 2232316  12/1990  United Kingdom .

*Primary Examiner*—Daniel T. Pihulic
*Attorney, Agent, or Firm*—Walter G. Sutcliff

[57] ABSTRACT

An apparatus and method for discriminating between false images created by multipath and an aircraft of interest in an air traffic control environment by maintaining a three-dimensional database in the area of interest of the air traffic control environment, the three-dimensional database including a position of a radar radiation source, three-dimensional positions, orientations, and sizes of fixed reflectors and three-dimensional positions, orientations, and sizes of non-fixed reflectors; receiving return radar radiation from an unknown object; classifying the unknown object as an aircraft of interest if the return radiation from the unknown object correlates with previous returns; and classifying the unknown object by searching for a plurality of candidate reflectors and if a sum of the distances between the plurality of candidate reflectors is approximately equal to a distance between the unknown object and the radar radiation source, classifying the unknown object as a false image created by multipath.

20 Claims, 4 Drawing Sheets

APPARATUS AND METHOD FOR MITIGATING MULTIPATH

BACKGROUND OF THE INVENTION

1. Field of the Invention

In general, the present invention relates to a method and apparatus for detecting multipath images. In particular, when utilizing an active sensor, such as a radar, false "ghost" images, created when the sensor beam reflects from more than one surface before being detected by a receiver, may be mistaken for returns from actual objects. More particularly, the present invention relates to a method and apparatus for distinguishing between false "ghost" images and actual airplanes in an air traffic control environment.

2. Description of the Prior Art

Radar has served as an effective sensor for detecting both cooperative and non-cooperative airborne and surface targets since World War II. As illustrated in FIG. 1, a typical radar system 10 includes a transmitter/receiver 12 which emits RF energy from an antenna 14 that "bounces off" a target A, B and returns to the transmitter/receiver 12. Pulse radar systems, such as Airport Surface Detection Equipment (ASDE) systems determine range R1 to a target A by measuring the time between transmission of a pulse and receipt of the return pulse. The azimuth angle theta is obtained by correlating the return pulse with a position of the antenna 14. The strength of the return is a function of the reflectivity of the target A and numerous other factors such as range, weather, etc.

Accidents involving aircraft and ground vehicles and aircraft ground collisions can occur at busy airports. More than three times as many near-accidents occur on the ground as in the air. In one such accident, an aircraft strayed onto the wrong runway and was struck by a second aircraft, resulting in a loss of life. In another accident, two aircraft collided when one aircraft was cleared to land on an occupied runway.

Medium-range airport surveillance radar, such as the Automated Radar Terminal System (ARTS) is good for detecting and tracking many aircraft within a large volume of airspace. However, such systems do not provide adequate surveillance coverage for ground-resident objects, including aircraft that are in the taxiing, holding (stopped), takeoff or landing phases of their flight profiles.

ASDE systems can provide high-resolution, short-range, clutter-free, surveillance information on aircraft and ground vehicles, both moving and fixed, located on or near the surface of airport movement and holding areas under all weather and visibility conditions. An ASDE system formats incoming surface detection radar information for a desired coverage area, and presents it to local and ground controllers on high-resolution, bright displays in the airport control tower cab. In addition to ASDE and ARTS systems, other sensor systems such as, for example, secondary surveillance radar (SSR), and global positioning system (GPS) can provide logically disparate parameters in physically disparate locations within the tower cab.

A large, busy airport is an environment having a vast number of possible conflict situations. In such a dynamic environment, the potential for collision between any given aircraft and any one of possible many ground-resident, and nearby airborne, objects may not be recognized until it is too late to avoid the collision.

In particular, the presence of multipath returns are a significant problem at large busy airports. As illustrated in FIG. 2, an ASDE-3 system 20 emits radar radiation. This radar radiation is reflected off an aircraft 22 on the ground and then off stationary ground objects such as a building 24, and projects a false "ghost" image 26 on the runway 28 or a false "ghost" image, which is not on a runway. Conventional ASDE system handle the off-runway situation by always blanking the same area, which means that images which appear in areas other than the runways, are not considered. As a result, in the conventional ASDE system, a multipath ghost image not on a runway, would not be presented to an air traffic controller.

Similarly, the conventional AMASS system generates track data in airways, taxiways, and runways and blanks out everything behind the first track.

What is needed therefore is an apparatus and method that processes all multipath signals and distinguishes between false "ghost" images and actual airplanes in an air traffic control environment.

SUMMARY OF THE INVENTION

The present invention is directed to a method and apparatus for distinguishing false ghost images which results from multipath reflections. More generally, the method and apparatus maintains a database containing the position of the sensor, the position, orientation, and size of fixed reflectors, such as buildings, and the position and size of other non-fixed reflectors, such as vehicles. When a sensor return, which is not correlated to any previous returns via a tracker, is received, the method and apparatus of the present invention seeks to determine if the return indicates the position of an actual object or if it is a false image created by multipath.

It is an object of the present invention to provide a method and apparatus for discriminating between false images created by multipath and aircraft of interest in an air traffic control environment based on distances from the radar source to the false image and a plurality of reflectors.

It is also an object of the present invention to provide a method and apparatus for discriminating between false images created by multipath and aircraft of interest in an air traffic control environment based on distances from the radar source to the false image and a plurality of reflectors, and three-dimensional sizes of the false image and the plurality of reflectors.

It is also an object of the present invention to provide a method and apparatus for discriminating between false images created by multipath and aircraft of interest in an air traffic control environment based on a three-dimensional size of the unknown object, a three-dimensional size of any of the plurality of candidate reflectors, and a sensor spreading constant.

It is also an object of the present invention to provide a method and apparatus for discriminating between false images created by multipath and aircraft of interest in an air traffic control environment based on a probability function, a sum of probabilities of all of the plurality of candidate reflectors, and a predefined threshold.

These and other objects are fulfilled by providing a method and apparatus which maintain a three-dimensional database in the area of interest of the air traffic control environment, the three-dimensional database including a position of a radar radiation source, three-dimensional positions, orientations, and sizes of fixed reflectors and three-dimensional positions, orientations, and sizes of non-fixed reflectors; receive return radar radiation from an unknown object; classify the unknown object as an aircraft of interest if the return radiation from the unknown object correlates with previous returns; and classify the unknown object by searching for a plurality of candidate reflectors and if a sum of the distances between the plurality of candidate reflectors is approximately equal to a distance between the unknown object and a radiation source, classifying the unknown object as a false image created by multipath.

These and other objects are also fulfilled by providing a method and apparatus which further classify the unknown object as a false image created by multipath if a three-dimensional size of the unknown object is greater than a three-dimensional size of any of the plurality of candidate reflectors multiplied by a sensor spreading constant.

These and other objects are also fulfilled by providing a method and apparatus which further apply a probability function to the return radiation from the unknown object and classifying the unknown object as a false image created by multipath if a sum of probabilities of all of the plurality of candidate reflectors is below a predefined threshold.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION OF THE PREFERRED EMBODIMENTS

Figure 1:
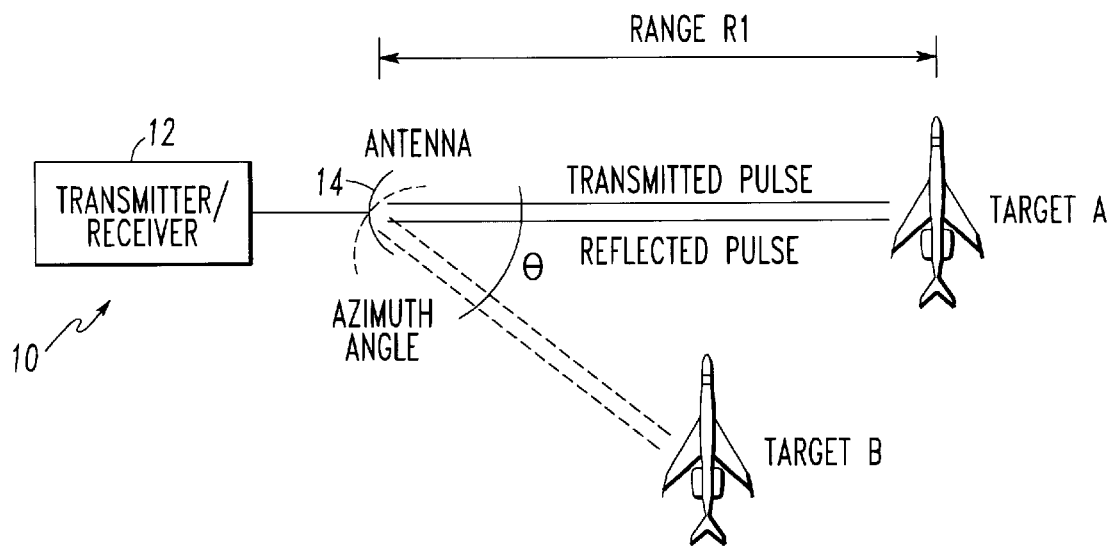
FIG. 1 illustrates a conventional radar system.
Figure 2:
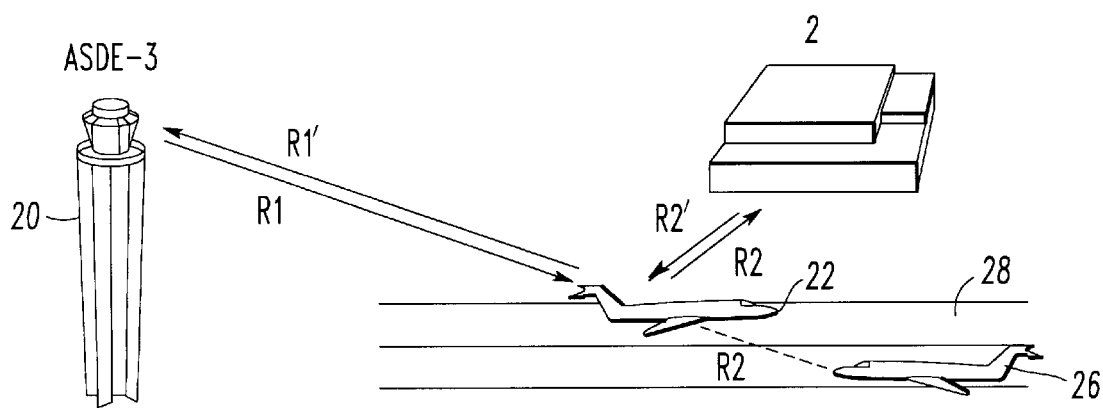
FIG. 2 illustrates an example of the multipath return problem.

In an ideal world, each target represents a single reflector visible by the radar via a single path at a unique range and azimuth. Unfortunately, when radar energy hits a reflector, it may bounce in such a way as to hit another reflector (or more) before returning to the receiver. This "multipath" effect is illustrated in FIG. 2.

The resulting problem presented to the radar operator (in this case the air traffic controller), is an additional "ghost" target at the same azimuth as the real target, but at a further range. The range to the ghost target in FIG. 2 is proportional to the total multipath transit time (R1+R1'+R2+R2') rather than the single bound transit time (R1+R1').

The number of ghost targets is a function of the number and reflectivity of specular reflectors in the region of interest. The airport surface is particularly rich in specular reflectors including the following:

a. flat metal surfaces (airplane tails, surfaces of buildings, etc.), and b. corner reflectors, baggage carts, aircraft landing gear, buildings at right angles, correlated buildings, and runway lights etc.

Since multipath is caused by multiple reflections, a particular alignment of the reflectors is required to cause an objectionable ghost target. As a result, the ghost targets may suddenly appear on the surface and may rapidly disappear and reappear. Since same multipath is caused by fixed reflectors (buildings, etc.), it often occurs repeatedly in certain areas. The intensity of the ghost targets varies from weaker to stronger than a real target depending on the reflectivity and alignment of the reflectors.

Figure 3:
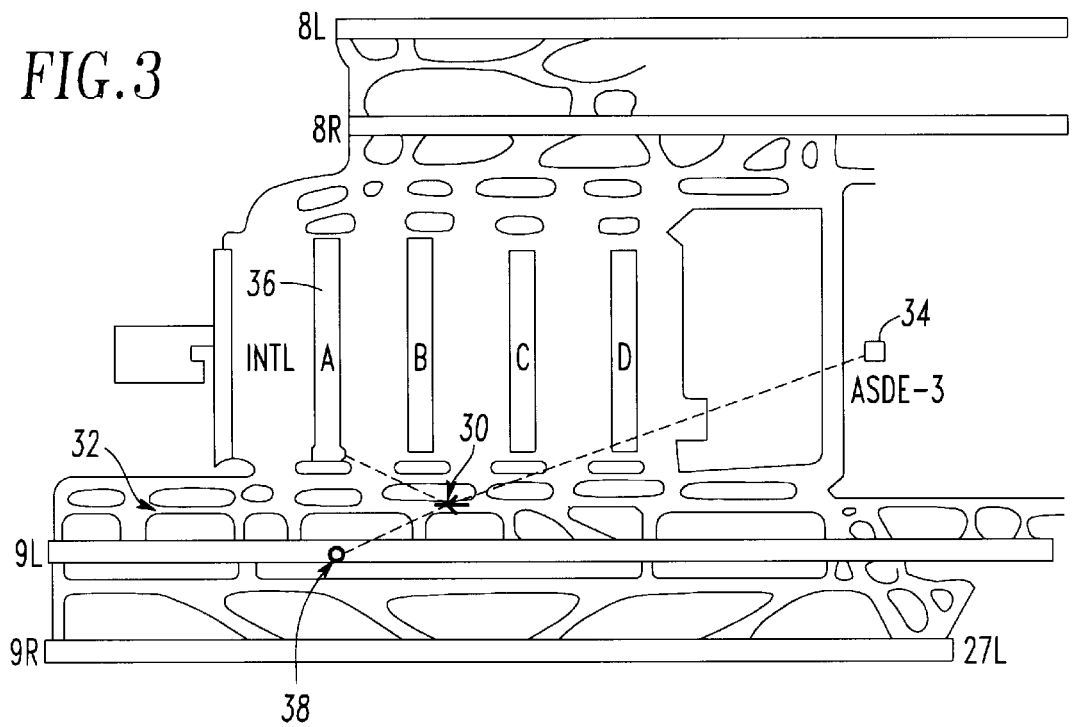
FIG. 3 illustrates an example of a specific multipath problem experienced at Atlanta's Hartsfield International Airport.
Figure 4:
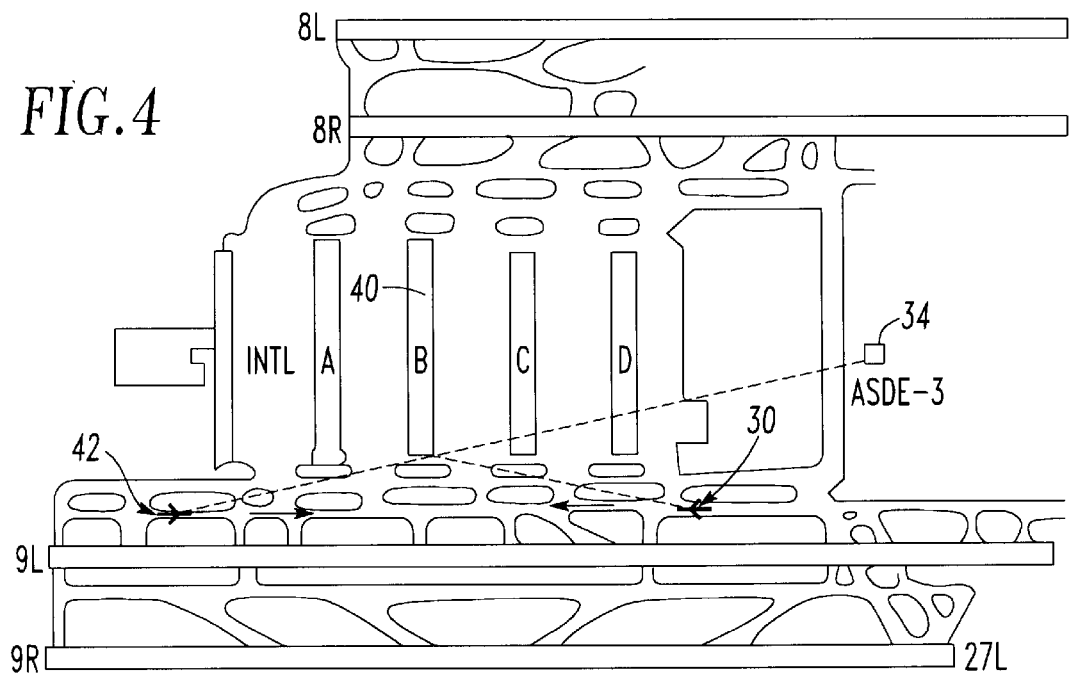
FIG. 4 illustrates a multipath image of a false target of substantial power in a head-on safety situation at Atlanta's Hartsfield International Airport.

An example of a specific multipath problem experienced at the Atlanta Airport is illustrated in FIG. 3. Aircraft 30 moving along the taxiway 32 provides a true target return and in addition, reflects the ASDE-3 34 pulse to Concourse A 36. As a result, a false ghost target 38 appears on runway 9L as indicated. A more troublesome scenario, illustrated in FIG. 4, is when the ASDE-3 34 pulse reflects off Concourse B 40, hits an aircraft 30 in a taxiway or runway moving towards Concourse B 40, and returns to the ASDE-3 receiver via the same path in the main lobe. The result is a multipath image 42 of a false target of substantial power in a head-on safety situation with itself, moving closer and closer as the aircraft moves.

Figure 5:
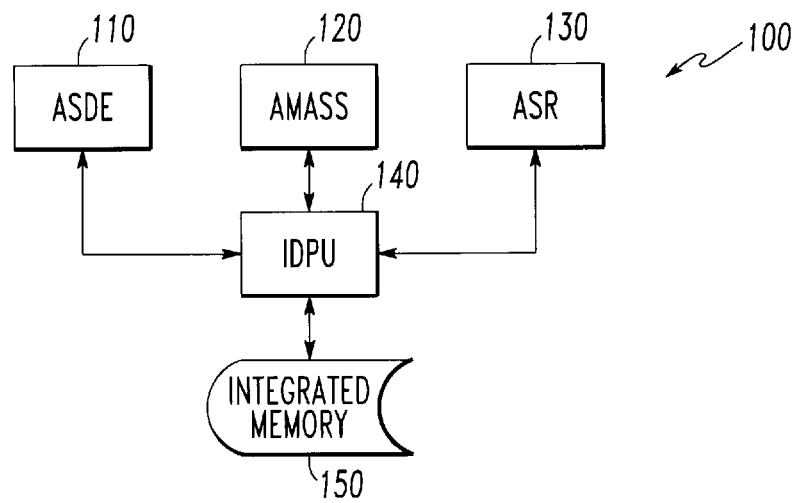
FIG. 5 illustrates an integrated air traffic control suite into which one embodiment of the present invention is implemented.

FIG. 5 illustrate an integrated air traffic control suite 100, into which one embodiment of the present invention is implemented. The air traffic control suite 100 includes an Airport Surface Detection Equipment (ASDE) suite 110, which is a ground surface radar system for detecting airplanes and other airport vehicles on the ground. The integrated air traffic control suite 100 also includes an Airport Movement Area Safety System (AMASS) 120 which receives ASDE 110 radar inputs and identifies targets in order to predict incursions and/or accidents. Finally, the integrated air traffic control suite 100 includes the Airport surveillance radar (ASR) 130 system which is a radar system for "approaching" aircraft.

The integrated air traffic control suite 100 further includes an Incursion and Display Processing Unit (IDPU) 140 which integrates the ASDE 110, AMASS 120, and ASR 130 data in an integrated memory 150 and produces airport displays, which include airplanes represented as icons, tracks, and lines and tags which include identifying information for each aircraft.

Figure 6:
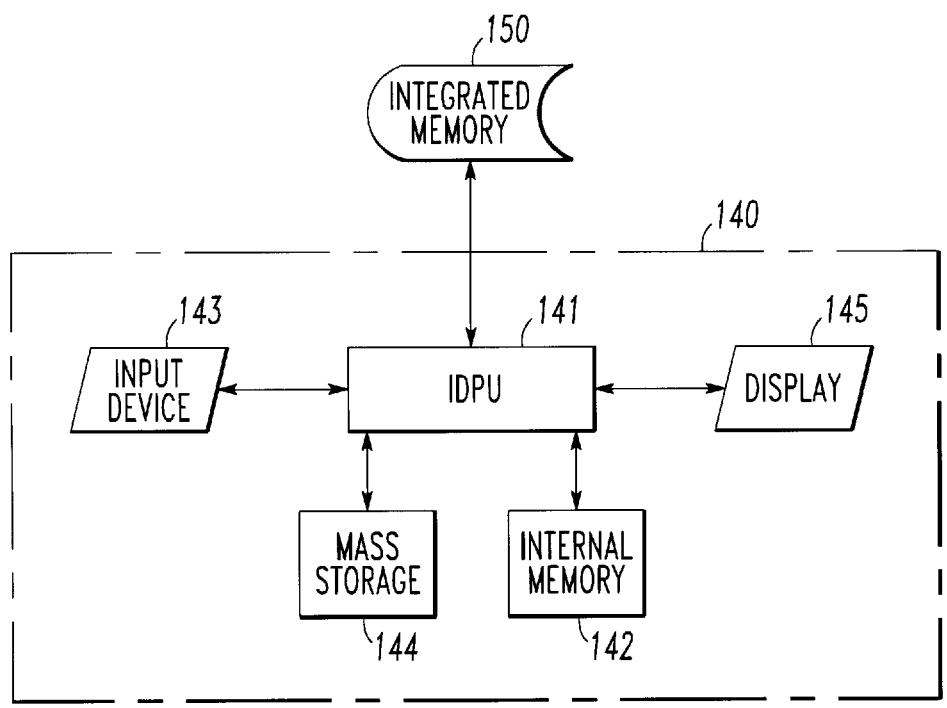
FIG. 6 illustrates a preferred embodiment of the present invention.

The functions of the apparatus and method of the present invention are performed by the IDPU 140, which is illustrated in further detail in FIG. 6. The IDPU 140 includes an incursion and display processor (IDP) 141, internal memory 142, an input device 143, a mass storage 144, and a display 145.

The IDP 141 maintains a data base in integrated memory 150, which contains the three-dimensional position of the sensor, the three-dimensional position, orientation, and size of all of the fixed reflectors, such as buildings, etc. at the site of interest and the three-dimensional system and size of other, non-fixed reflectors (such as ground vehicles). When a sensor return is received which is not correlated (through the use of a tracker) with any previous returns, the IDP 141 seeks to determine if the return indicates the three-dimensional position of an actual object or if it is a false image created by multipath.

In order to make this determination, the IDP 141 first attempts to find a primary reflector along a direct line between the unknown image and the sensor. If this primary reflector is found, the distance between the primary reflector and the sensor is subtracted from the distance from the unknown image and the sensor.

A search is then made for a secondary reflector, which has a distance from the primary reflector that is less than or equal to the remaining distance to the unknown image. If the secondary reflector is found, the distance between the secondary reflector and the first reflector is subtracted from the remaining distance.

A search is then made for another reflector, until either the sum of the distance between each of the subsequent reflectors is approximately equal to the distance between the unknown image and the sensor or until the search has been completed to the Nth order, where N is a selectable constant that refers to the number of reflectors, where N=1 (first order is not possible), N=2 (second order) indicates two reflectors, etc. The probability of discovering a multipath solution decreases rapidly as the value of N increases.

In addition, the IDP 141 utilizes the size of the various candidate reflectors and the size of the unknown multipath image in order to determine whether the unknown object is a false multipath image. In particular, the sensor beam from the transmitter/receiver is assumed not to spread by more than a programmable constant. Therefore, the size of the unknown image cannot be greater than a product of this programmable constant and a size of any of the reflectors.

Furthermore, when considering reflections, the IDP 141 applies a probability function to the reflected beam. This function indicates that more of a beam will be reflected along its expected angle of reflection (and therefore produce a higher likelihood of multipath in that direction) with less energy reflected to either side of this angle. If the aggregate probabilities of all of the reflectors falls below a predefined threshold, that sequence of reflectors is rejected as a source of multipath.

Figure 7:
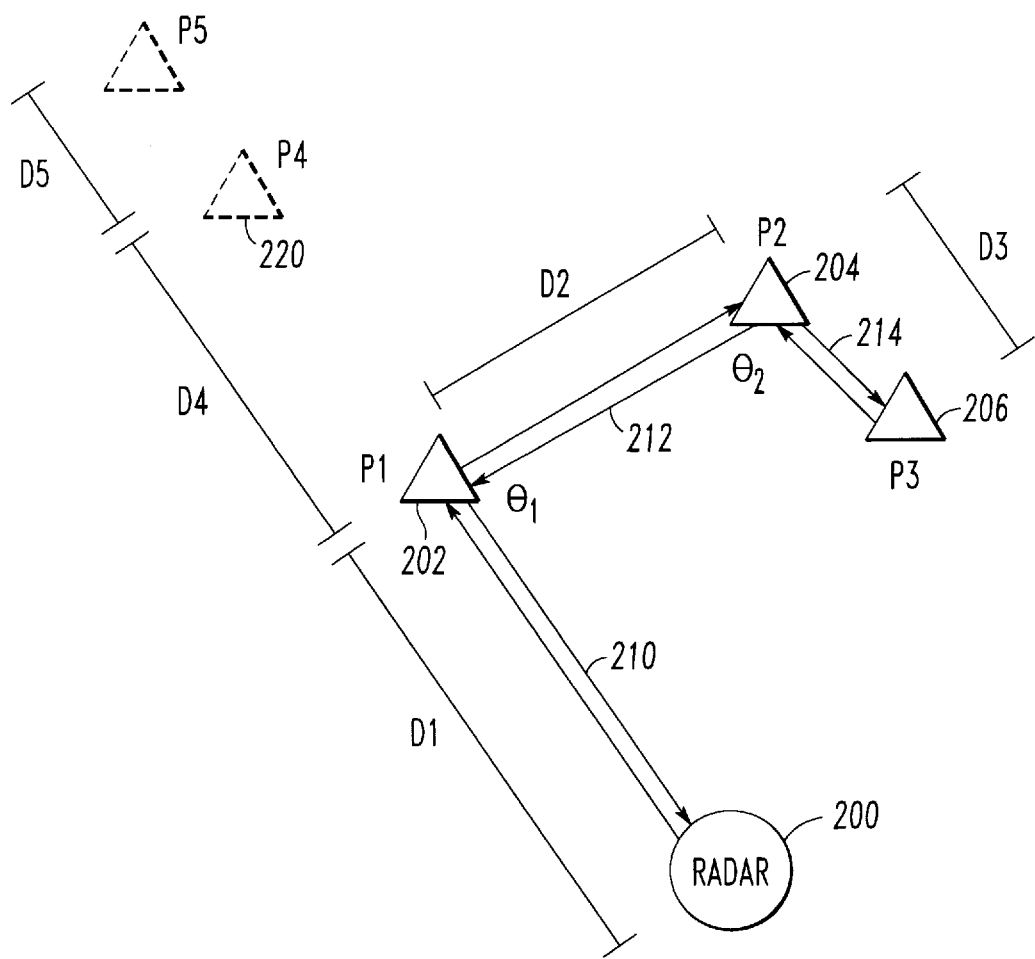
FIG. 7 illustrates an example geometry which creates multipath discriminated by the hardware illustrated in FIG. 6.

The functions performed by the incursion and display processor (IDP) 141 are described further below with reference to an example geometry illustrated in FIG. 7.

The radar energy emitted from radar source/receiver 200 reflects off reflector 202 and returns to the radar source/receiver 200. The IDP 141 now has an object of interest 202 at position P1, a distance D1 from the radar source/receiver 200. However, the object of interest 202 at position P1 has multiple facets, and some of the radiation from the radar source/receiver 200 is not reflected back, but rather is reflected off a second object of interest 204 at position P2, a distance D2 from the position P1. Therefore, the first radiation path 210 is from the radar source/receiver 200 to position P1 and back. However, the first "multipath" 210, 212 is from the radar source/receiver 200 to position P1 to position P2, back to position P1 and then returning to the radar source/receiver 200.

Assume further that some of the radiation from the radar source/receiver 200 bounces off of the object of interest 204 at position P2 to another object of interest 206 at position P3, a distance D3 from position P2. Similarly, another multipath 210, 212, 214 is formed. These two multipaths result in ghost objects distances D4 (equal to D2) and D4+D5 (where D5 is equal to D3) from position P1, along the line between the radar source/receiver 200 and the object of interest 202. The object of interest 202 at position P1 is known as the primary reflector; the object of interest 204 at position P2 is known as the secondary reflector; and the object of interest 206 at position P3 is the tertiary reflector.

The IDP 141 performs the following functions in order to determine whether the ghost images at positions P4 and P5, are in fact ghost images, and in fact result from a multipath return from the primary, secondary, and tertiary reflectors.

The IDP 141 first attempts to determine whether it finds a primary reflector along a direct line between the unknown image 220 and the radar source/receiver 200. If this primary reflector is found, the distance between the primary reflector and the radar source/receiver 200 is subtracted from the distance from the unknown image 220 and the radar source/receiver 200. A search is then made for a secondary reflector which has a distance from the primary reflector that is less than or equal to the remaining distance to the unknown image 220. If the secondary reflector is found, the distance between the secondary reflector and the first reflector is subtracted from the remaining distance. A search is then made for another reflector until either the sum of the distance between each of the subsequent reflectors is approximately equal to the distance between the unknown image and the radar source/receiver 200 or until the search has been completed to the Nth order. The probability of discovering a multipath solution decreases rapidly as the value N increases.

In another preferred embodiment, the size of the primary, secondary, and tertiary reflectors and of the possible multipath images and/or probability functions are also utilized to determine if an unknown image 220 is a multipath image. In this case, the radar source/receiver 200 beam is assumed not to spread by more than a programmable constant and the size of the unknown image 220 cannot be greater than the product of this constant and the size of any of the reflectors. In particular, the primary reflector must pass the following size requirement, namely the distance between the azimuth of the unknown image 220 with respect to the radar source/receiver 200 and an azimuth of the primary reflector with respect to the radar source/receiver 200 must be less than or equal to two times the azimuth extent of the primary reflector. This difference is referred to as the azimuth difference AD.

Assuming a primary reflector has been found, the secondary reflector is searched for by utilizing a recursive routine which requires as inputs:

a. The position of the primary reflector in an absolute coordinate system;

b. the azimuth of the primary reflector with respect to the radar source/receiver 200;

c. The remaining range to the unknown image 220 (the range from the radar source/receiver 200 to the unknown image 220 minus the range from the radar source/receiver 200 to the primary reflector);

d. The accumulated azimuth extent (the azimuth extend of the primary reflector);

e. The accumulated size (the size of the primary reflector);

f. A distance from the radar source/receiver 200 to the primary reflector;

g. The azimuth difference calculate above; and h. An initial probability of reflection (a constant value).

The recursive routine utilizes the above-identified inputs and a candidate secondary reflector must pass the following size and probability requirements:

First, a value D, is calculated, which is a difference between the reflector angle θ and the angle of the subsequent reflector θ with respect to the previous reflector and the value $1.0 - e^{(-0.09D)}$ must be less than the probability threshold.

The azimuth extent AE must also be calculated:

$$2 \arctan\left(\frac{S}{X+Y}\right) \quad \quad 5$$

where S=size of the candidate second reflector
X=the accumulated range
Y=a distance from the primary reflector to the candidate secondary reflector Still further, in order for the azimuth extent AE to be correct:

$$\frac{1}{2}(AS + S) > \left| Y - Z + \frac{1}{2} MS \right| \quad (1)$$

where AS=accumulated size
Z=a remaining range
MS=size of the unknown image
and $$\frac{1}{2}(AA + AE) > \left( U1 + \frac{1}{2} PUAE \right) \quad (2)$$

AA=accumulated azimuth extent
U1=unknown image/primary reflector azimuth difference
PUAE=possible unknown image azimuth extent If either of equations (1) or (2) is not true then if the distance from the previous reflector to the subsequent reflector is less then the remaining range, then the routine described above is called recursively to look for an additional reflector.

In summary, if a path of proper length, between reflectors of the proper size is found, the image is declared to be caused by multipath. The efficacy of this process is greatly improved by the use of a tracker. This enables the IDP 141 to be used only when a new (not previously tracked) return is reported to the tracker, where previously tracked returns are necessarily non-multipath. This process is also improved in an environment in which more than one radar source/receiver 200 exists. If a new return corresponds to the position of a track beam reported by another radar source/receiver 200, then the return is not caused by multipath.

As set forth above, the process and apparatus disclosed in the present application has immediate applicability to surface radar programs such as ASDE-3, AMASS and IDPU as an effective technique for eliminating false tracks and false safety alarms caused by multipath. The process and method of the present application are also useful for eliminating multipath returns from three-dimensional sensors such as enroute, approach, and three-dimensional surface surveillance radars. The process and apparatus of the present application can also be applied to other active sensors, such as active sonars.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. An apparatus for discriminating between false images created by multipath and an aircraft of interest in an air traffic control environment, comprising:

an incursion and display processor maintaining a three-dimensional database in the area of interest of the air traffic control environment, the three-dimensional database including a position of a radar radiation source, three-dimensional positions, orientations, and sizes of fixed reflectors and three-dimensional positions, orientations, and sizes of non-fixed reflectors; receiving return radar radiation from an unknown object; classifying the unknown object as an aircraft of interest if the return radiation from the unknown object correlates with previous returns; and classifying the unknown object by searching for a plurality of candidate reflectors and if a sum of the distances between the plurality of candidate reflectors is approximately equal to a distance between the unknown object and a radiation source, classifying the unknown object as a false image created by multipath.

2. The apparatus of claim 1, wherein the return radiation from the unknown object correlates with previous returns, as determined by a tracker.

3. The apparatus of claim 1, said incursion and display processor further classifying the unknown object as a false image created by multipath if a size of the unknown object is greater than a size of any of the plurality of candidate reflectors multiplied by a sensor spreading constant.

4. The apparatus of claim 1, said incursion and display processor further applying a probability function to the return radiation from the unknown object and classifying the unknown object as a false image created by multipath if a sum of probabilities of all of the plurality of candidate reflectors is below a predefined threshold.

5. The apparatus of claim 4, wherein the probability function assumes most of the return radar radiation from the unknown object is reflected along an expected angle of reflection.

6. The apparatus of claim 1, said incursion and display processor further classifying the unknown object as an aircraft of interest if the return radiation from the unknown object correlates with previous returns from another sensor.

7. The apparatus of claim 3, said incursion and display processor further determining whether a first of the plurality of candidate reflectors exists, based on size, and determining whether a second of the plurality of candidate reflectors exists, based on size and probability.

8. The apparatus of claim 7, said incursion and display processor further determining an azimuth difference between an azimuth of the unknown object with respect to the radar radiation source and an azimuth of the first of the plurality of candidate reflectors with respect to the radar radiation source, and determining that the first of the plurality of candidate reflectors exists if the azimuth difference in said step f1a) is less than or equal to two times an azimuth extent of the first of the plurality of candidate reflectors.

9. The apparatus of claim 8, said incursion and display processor further receiving a position of the first of the plurality of candidate reflectors in an absolute coordinate system, the azimuth of the first of the plurality of candidate reflectors with respect to the radar radiation source, a remaining range to the unknown object, an accumulated azimuth extent, an accumulated size, a distance from the first of the plurality of candidate reflectors to the radar radiation source, the azimuth difference from said step f1a), and an initial probability of reflection, and determining that the second of the plurality of candidate reflectors exists if $1.0-e^{(-0.9D)}$ is less than the probability threshold, where D is a difference between a previous reflector angle and an angle of the second of the plurality of candidate reflectors with respect to the first of the plurality of candidate reflectors, one half of a sum of the accumulated size plus the size of the second of the plurality of candidate reflectors must be greater than an absolute value of a difference between a distance between the first of the plurality of candidate reflectors and the second of the plurality of candidate reflectors and the remaining range plus one half of the possible multipath size, and one half of a sum of the accumulated azimuth extent and the azimuth extent must be greater than the azimuth difference plus one half of the possible multipath azimuth extent.

10. The apparatus of claim 9, wherein if either the conditions of said steps f2b2) and f2b3) are not met and the distance from the first of the plurality of candidate reflectors to the second of the plurality of candidate reflectors is less than the remaining range, then said step f2) is recursively repeated to determine whether the second of the plurality of candidate reflectors exists.

11. A method for discriminating between false images created by multipath and aircraft of interest in an air traffic control environment, comprising the steps of:

a) maintaining a three-dimensional database in the area of interest of the air traffic control environment, the three-dimensional database including a position of a radar radiation source, three-dimensional positions, orientations, and sizes of fixed reflectors and three-dimensional positions, orientations, and sizes of non-fixed reflectors;

b) emitting radar radiation from the radar radiation source;

c) receiving return radar radiation from an unknown object;

d) classifying the unknown object as an aircraft of interest if the return radiation from the unknown object correlates with previous returns; and e) classifying the unknown object by searching for a plurality of candidate reflectors and if a sum of the distances between the plurality of candidate reflectors is approximately equal to a distance between the unknown object and the radar radiation source, classifying the unknown object as a false image created by multipath.

12. The method of claim 11, wherein in step d), the return radiation from the unknown object correlates with previous returns, as determined by a tracker.

13. The method of claim 11, further comprising the step of:

f) classifying the unknown object as a false image created by multipath if a size of the unknown object is greater than a size of any of the plurality of candidate reflectors multiplied by a sensor spreading constant.

14. The method of claim 11, further comprising the step of:

f) applying a probability function to the return radiation from the unknown object and classifying the unknown object as a false image created by multipath if a sum of probabilities of all of the plurality of candidate reflectors is below a predefined threshold.

15. The method of claim 14, wherein the probability function assumes most of the return radar radiation from the unknown object is reflected along an expected angle of reflection.

16. The method of claim 11, further comprising the step of:

f) classifying the unknown object as an aircraft of interest if the return radiation from the unknown object correlates with previous returns from another sensor.

17. The method of claim 13, said step f) further including the sub-steps of:

f1) determining whether a first of the plurality of candidate reflectors exists, based on size, and f2) determining whether a second of the plurality of candidate reflectors exists, based on size and probability.

18. The method of claim 17, said step f1) further including the sub-steps of:

f1a) determining an azimuth difference between an azimuth of the unknown object with respect to the radar radiation source and an azimuth of the first of the plurality of candidate reflectors with respect to the radar radiation source, and f2a) determining that the first of the plurality of candidate reflectors exists if the azimuth difference in said step f1a) is less than or equal to two times an azimuth extent of the first of the plurality of candidate reflectors.

19. The method of claim 18, said step f2) further including the sub-steps of:

f2a) inputting a position of the first of the plurality of candidate reflectors in an absolute coordinate system, the azimuth of the first of the plurality of candidate reflectors with respect to the radar radiation source, a remaining range to the unknown object, an accumulated azimuth extent, an accumulated size, a distance from the first of the plurality of candidate reflectors to the radar radiation source, the azimuth difference from said step f1a), and an initial probability of reflection, and f2b) determining that the second of the plurality of candidate reflectors exists if f2b1) $1.0-e^{(-0.9D)}$ is less than the probability threshold, where D is a difference between a previous reflector angle and an angle of the second of the plurality of candidate reflectors with respect to the first of the plurality of candidate reflectors, f2b2) one half of a sum of the accumulated size plus the size of the second of the plurality of candidate reflectors is greater than an absolute value of a difference between a distance between the first of the plurality of candidate reflectors and the second of the plurality of candidate reflectors and the remaining range plus one half of the possible multipath size, and f2b3) one half of a sum of the accumulated azimuth extent and the azimuth extent must be greater than the azimuth difference in said step f1a) plus one half of the possible multipath azimuth extent.

20. The method of claim 19, wherein if either the conditions of said steps f2b2) and f2b3) are not met and the distance from the first of the plurality of candidate reflectors to the second of the plurality of candidate reflectors is less than the remaining range, then said step f2) is recursively repeated to determine whether the second of the plurality of candidate reflectors exists.

* * * * *